No. 894,094.　　　　　　　　　　　PATENTED JULY 21, 1908.
J. A. ALLEY.
SPOKE JACK.
APPLICATION FILED JUNE 17, 1907.
FIG. 1.
FIG. 2.
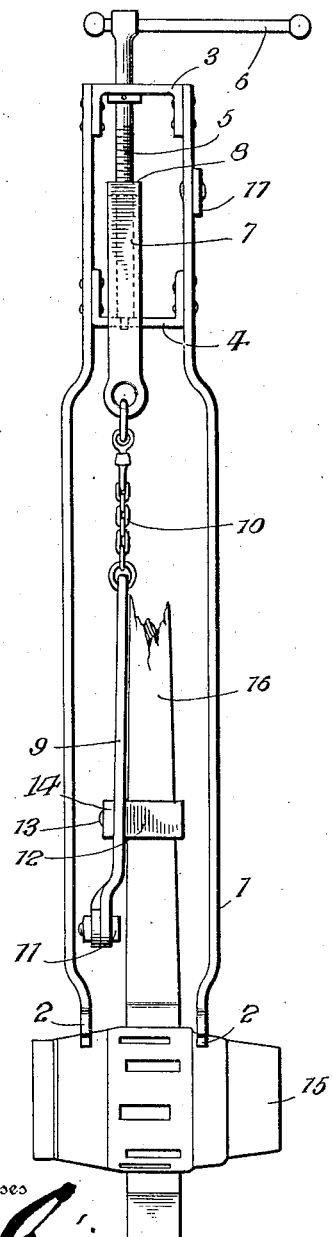
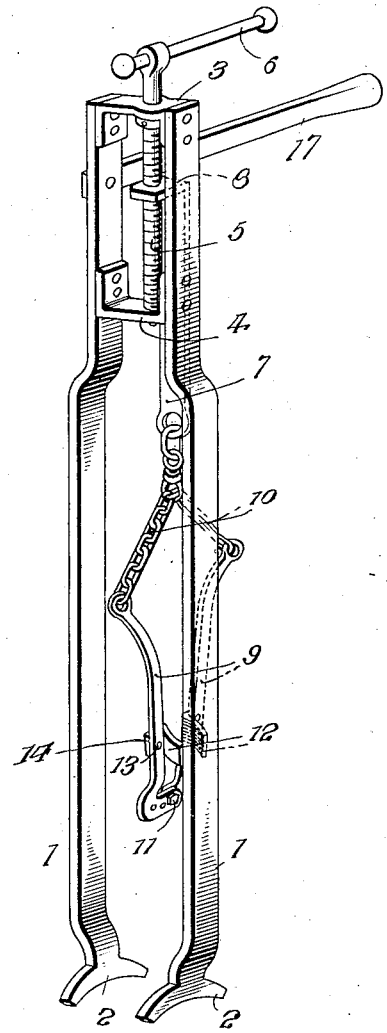
Inventor
James A. Alley
Witnesses
By R. H. & A. B. Lacey, Attorneys

UNITED STATES PATENT OFFICE.

JAMES ALFORD ALLEY, OF STONEVILLE, NORTH CAROLINA.

SPOKE-JACK.

No. 894,094.  Specification of Letters Patent.  Patented July 21, 1908.

Application filed June 17, 1907. Serial No. 379,488.

*To all whom it may concern:*

Be it known that I, JAMES ALFORD ALLEY, citizen of the United States, residing at Stoneville, in the county of Rockingham and State of North Carolina, have invented certain new and useful Improvements in Spoke-Jacks, of which the following is a specification.

This invention has for its object to provide means for removing broken spokes from the hubs of vehicle wheels without marring, bruising or otherwise injuring the finish of the hub or other part of the wheel, while at the same time enabling the work to be performed in a rapid and effective manner.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a front view of a spoke extractor embodying the invention and showing the same fitted to a vehicle wheel as it will appear when in position for pulling or removing a spoke. Fig. 2 is a perspective view of the machine.

Corresponding and like parts are referred to in the following description and indicated in all the views of the drawings by the same reference characters.

In its organization the machine embodies a frame, a spoke grapple, a power screw and connecting means between the spoke grapple and power screw.

The frame of the machine is constructed to straddle a vehicle wheel, as indicated in Fig. 1, and to engage with end portions of the hub or with the latter at each side of the frame of the wheel so as to equalize the strain and enable a direct pull upon the spoke being exerted. The frame comprises legs or side members 1 which are off-set near opposite ends to throw the terminal portions of the legs or side members inward towards each other. The lower ends of the legs or side members 1 are provided with forked rests 2 for engagement with end portions of the hub of the vehicle wheel to enable the frame to obtain a firm purchase thereon.

Cross pieces 3 and 4 connect the upper portions of the legs or side members 1 and brace the frame and form bearings to receive the power screw 5. The power screw 5 may be turned by any convenient means, such as handle 6, which is passed through an opening formed in the head of the power screw, thereby admitting of shifting the handle from one end to the other according as may be required to suit the convenience of the user. A draft bar 7 has its upper end bent about at a right angle, as shown at 8, and formed with an internally threaded opening to receive the power screw 5. The lower end of the draft bar is connected with a spoke grapple, the connection having a swivel to admit of the parts readily adapting themselves to the direction of strain. The spoke grapple comprises similar members 9 having their lower ends bent and pivotally connected and having their upper ends outwardly deflected and connected by short chains 10 with a swivel fitted to the lower end of the draft bar 7. The members 9 are connected by pivot fastening 11, the latter being passed through one of a series of openings formed in the bent ends of the members 9, thereby admitting of adjustably connecting said members according to the size of the spoke to be extracted. Jaws 12 project laterally from the members 9 and their faces are roughened to prevent slipping when the grapple is fitted to the spoke and the power screw turned to effect removal of said spoke from the hub. The jaws 12 are secured to the members 9 by suitable fastenings 13 to admit of said jaws being removed for any purpose.

When it is required to remove a spoke from a vehicle wheel, the machine is fitted to the wheel and having the legs or members of its frame straddle the same and engaging with end portions of the hub 15. The grapple is fitted to the spoke 16 to be removed and upon turning the power screw, the free ends of the members 9 are drawn inward, thereby causing the jaws 12 to firmly grip the spoke 16, while at the same time great power is brought to bear upon the spoke to remove it from its socket in the hub. For convenience of steadying the machine, a bar 17 is pivoted to one of the legs or side members 1 and constitutes a handle. When the machine is not in use, the bar 17 may be folded in the plane of the frame so as not to be in the way.

Having thus described the invention, what is claimed as new is:

In a device for removing spokes from vehicle wheels, the combination of a frame adapted to span the wheel and engage the hub thereof, the said frame comprising side bars connected at one end by a cross piece, a power screw journaled upon the cross piece, a draft bar having one end thereof bent laterally and in threaded engagement with the power screw, a grapple comprising complemental side members each having one end thereof extended inwardly while the opposite end is deflected outwardly, the said inwardly extended ends being adjustably connected by a pivot member and spoke engaging jaws being provided which project laterally from intermediate portions of the members, and connecting means between the outwardly deflected ends of the grapple members and the draft bar.

In testimony whereof I affix my signature in presence of two witnesses.

JAMES ALFORD ALLEY. [L. S.]

Witnesses:
T. L. SMITH,
G. M. MITCHELL.